United States Patent
An et al.

(10) Patent No.: US 9,928,822 B2
(45) Date of Patent: Mar. 27, 2018

(54) AUDIO SYSTEM, VEHICLE HAVING THE SAME, AND METHOD FOR CONTROLLING THE AUDIO SYSTEM

(71) Applicant: Hyundai Motor Company, Seoul (KR)

(72) Inventors: Gil Sup An, Gyeonggi-do (KR); Jihoon Sung, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/334,404

(22) Filed: Oct. 26, 2016

(65) Prior Publication Data

US 2017/0186415 A1   Jun. 29, 2017

(51) Int. Cl.
| | | |
|---|---|---|
| G10K 11/16 | (2006.01) |
| G10K 11/178 | (2006.01) |
| H04B 7/00 | (2006.01) |
| H04L 25/08 | (2006.01) |

(52) U.S. Cl.
CPC ............ *G10K 11/178* (2013.01); *H04B 7/00* (2013.01); *H04L 25/08* (2013.01); *G10K 2210/1282* (2013.01); *G10K 2210/3044* (2013.01); *H04R 2499/13* (2013.01)

(58) Field of Classification Search
CPC ..... G10K 2210/1282; G10K 2210/128; G10K 2210/1281
USPC ........................................... 381/61, 66, 71.4
See application file for complete search history.

(56) References Cited

U.S. PATENT DOCUMENTS

| | | | |
|---|---|---|---|
| 4,815,141 A | | 3/1989 | Carver et al. |
| 9,100,081 B2* | | 8/2015 | Hirano .................. H04B 1/126 |
| 2008/0008341 A1* | | 1/2008 | Edwards .............. H04R 25/552 |
| | | | 381/315 |
| 2010/0244943 A1* | | 9/2010 | Hahn .................. H03H 11/1291 |
| | | | 327/553 |
| 2013/0039505 A1* | | 2/2013 | Kawano .............. H04B 1/0007 |
| | | | 381/71.1 |

FOREIGN PATENT DOCUMENTS

| | | |
|---|---|---|
| JP | 2003-172776 A | 6/2003 |
| JP | 2003-273754 A | 9/2003 |
| JP | 2005-210382 A | 8/2005 |
| JP | 2008-236021 A | 10/2008 |
| JP | 2009-027699 A | 2/2009 |
| KR | 2003-0066062 A | 8/2003 |
| KR | 2013-0079868 A | 7/2013 |

* cited by examiner

*Primary Examiner* — Disler Paul
(74) *Attorney, Agent, or Firm* — Mintz Levin Cohn Ferris Glovsky and Popeo, P.C.; Peter F. Corless

(57) ABSTRACT

An audio system includes: a receiver receiving a first broadcast signal corresponding to a frequency selected by a user; a controller comparing a signal strength of the first broadcast signal in a first broadcast band to a signal strength of the first broadcast signal in a second frequency band and determining which frequency band of the first and second frequency bands has a higher signal strength based on the comparison; and a signal processor generating a second broadcast signal by changing a phase of the first broadcast signal in the determined frequency band, and generating a third broadcast signal in the determined frequency band canceled by synthesizing the first and second broadcast signals.

17 Claims, 14 Drawing Sheets

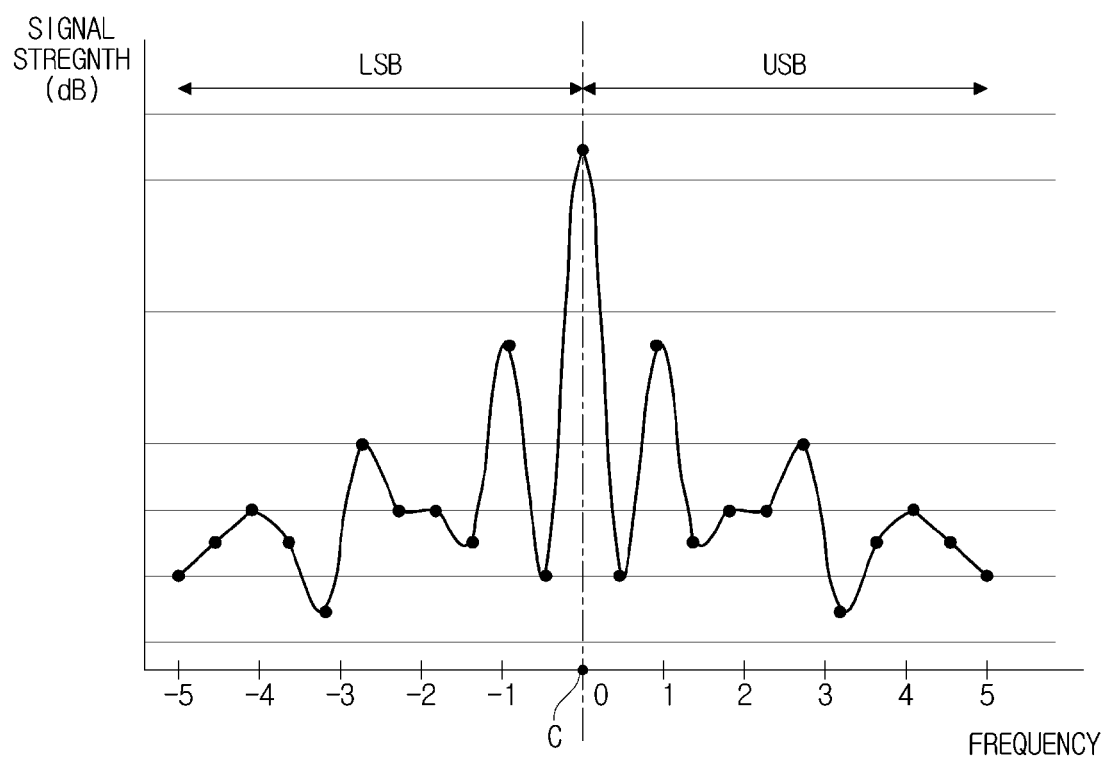

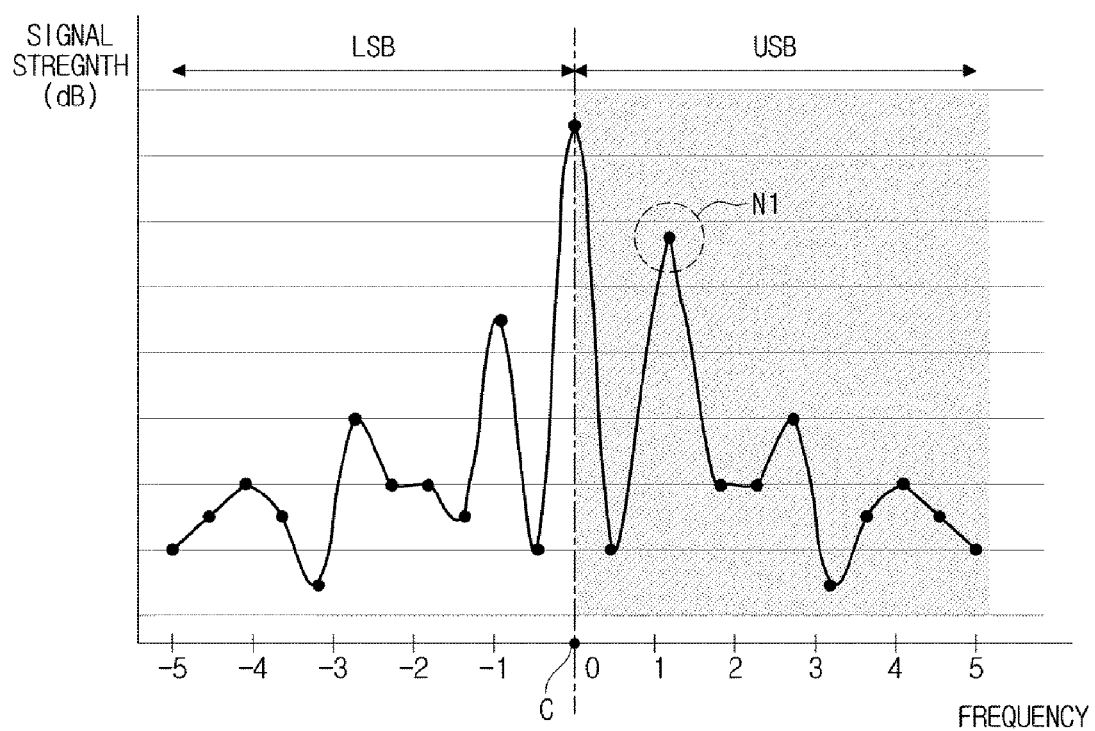

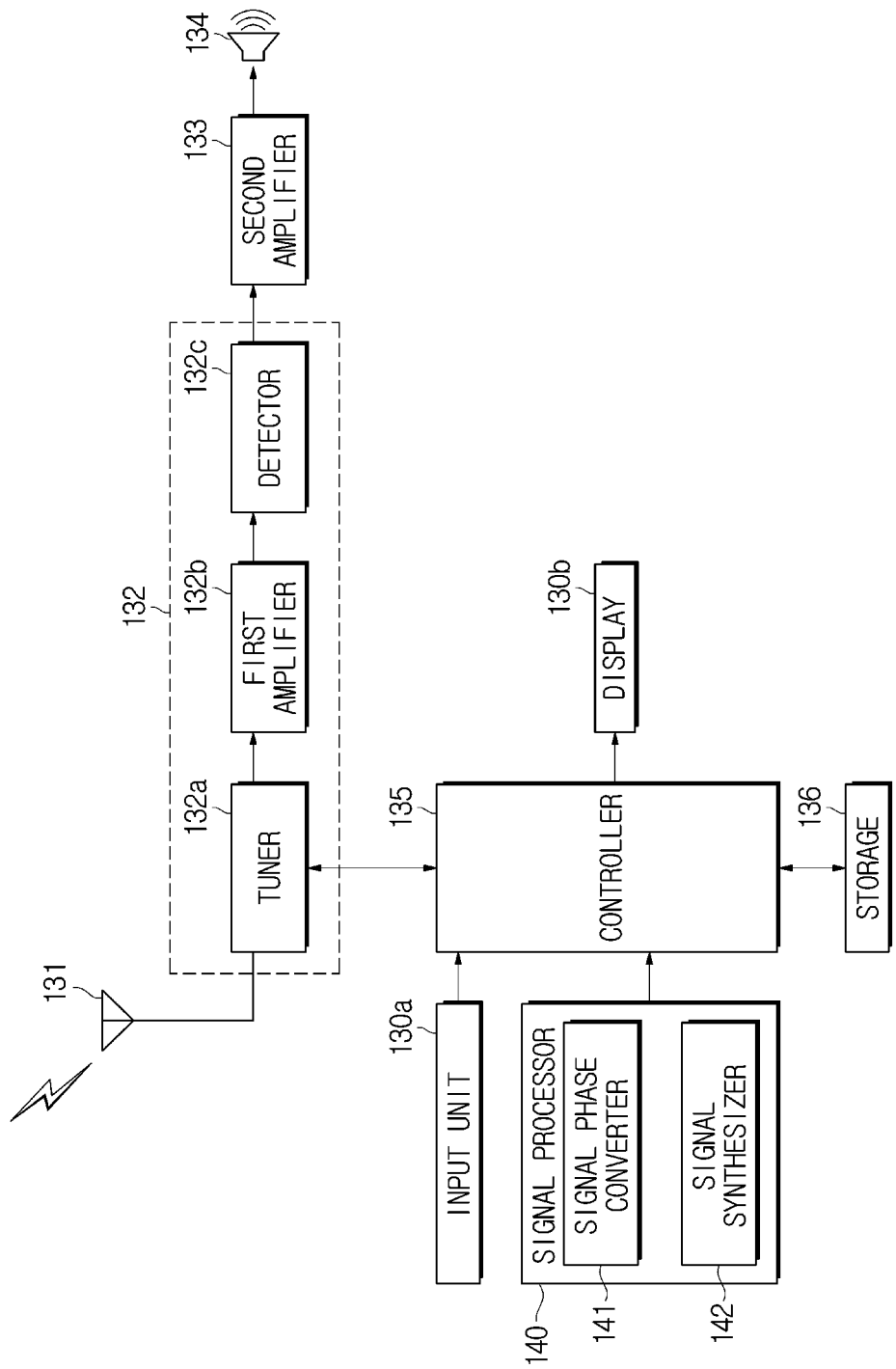

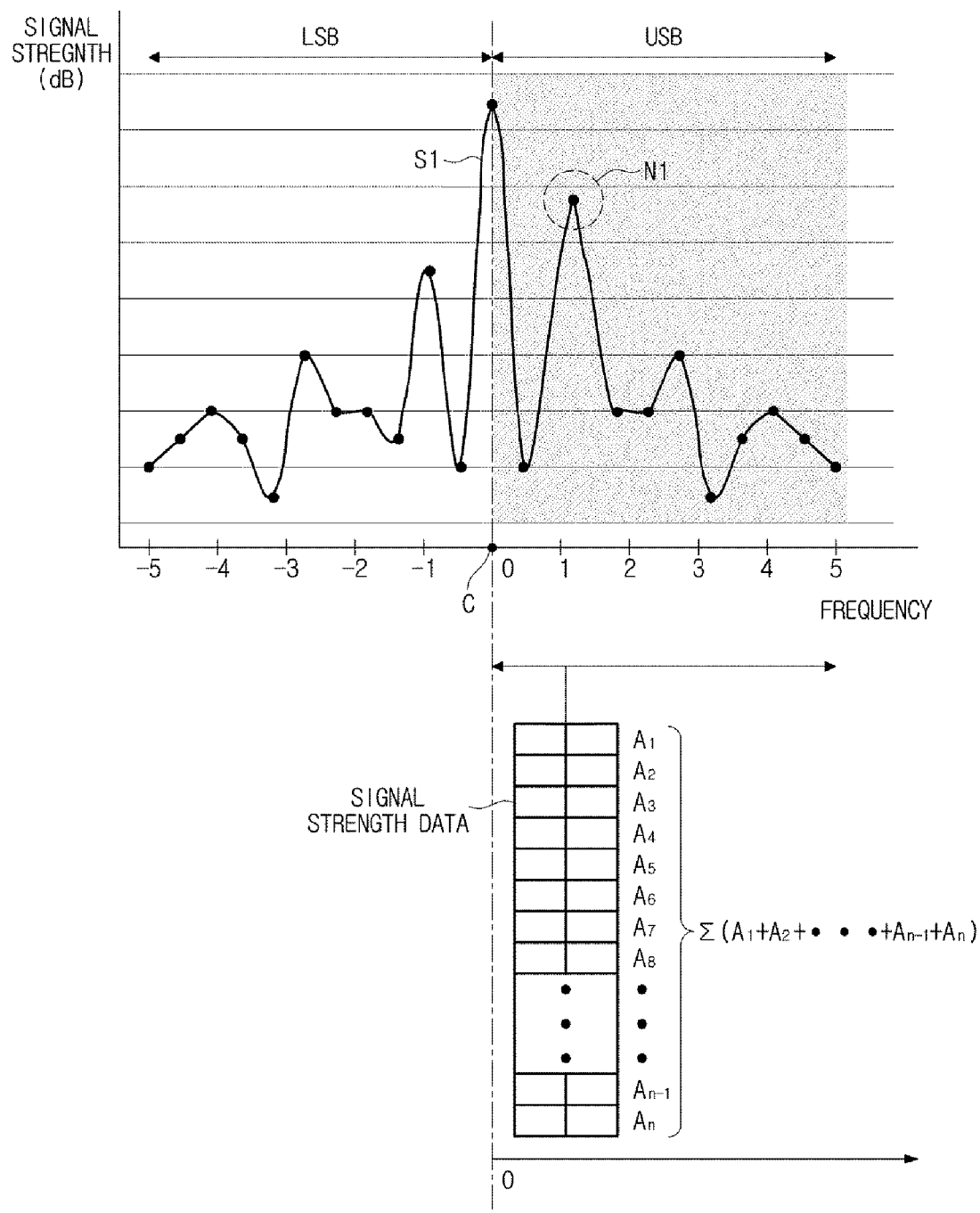

FIG. 8
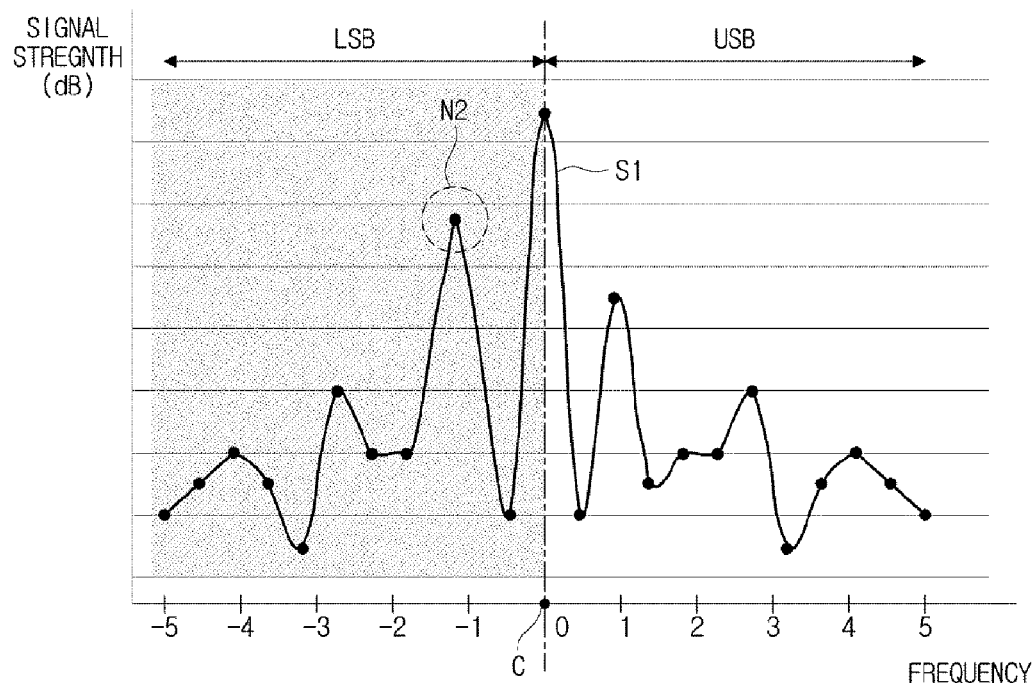
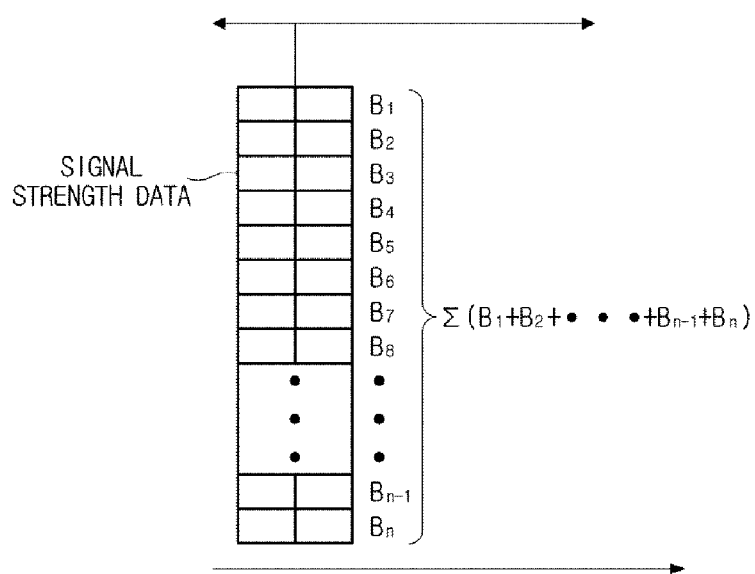

AUDIO SYSTEM, VEHICLE HAVING THE SAME, AND METHOD FOR CONTROLLING THE AUDIO SYSTEM

CROSS-REFERENCE TO RELATED APPLICATION

This application claims priority to and the benefit of Korean Patent Application No. 10-2015-0184761, filed on Dec. 23, 2015, the disclosure of which is incorporated herein by reference in its entirety.

BACKGROUND

1. Technical Field

Embodiments of the present disclosure relate generally to an audio system, vehicle having the audio system, and method for controlling the audio system, and more particularly, to an audio system that outputs noise-free broadcast signals by canceling noisy band signals from radio broadcast signals.

2. Discussion of Related Art

Current vehicles have various utility functions relating to audio, video, navigation, air conditioning, seat heating, communication, and the like, in addition to basic driving functions. Among them, the audio function may be performed by an audio system equipped in the vehicle. The audio system may output audio, and specifically, may receive and output audio broadcast signals. Typical audio systems may include tape player, Compact Disc (CD) player, MP3 player functions, etc., integrated therein to play various multimedia.

Recently, as electronic parts mounted on the vehicle have become diversified and grown in number, more electromagnetic waves and noise interference occur due to the electronic parts. If such electromagnetic waves and noise are present in the same frequency band as an audio broadcast signal, the broadcast signal being received may include noise, which prevents people in the vehicle from listening to optimal sound quality of the broadcast signal. Accordingly, techniques for eliminating noise included in broadcast signals being received by an audio system of a vehicle have been researched.

SUMMARY OF THE DISCLOSURE

Embodiments of the present disclosure provide an audio system, vehicle having the same, and method for controlling the audio system to improve performance of receiving audio broadcast signals by canceling noisy frequency band signals from radio broadcast signals to output noise-free broadcast signals.

In accordance with embodiments of the present disclosure, an audio system includes: a receiver receiving a first broadcast signal corresponding to a frequency selected by a user; a controller comparing a signal strength of the first broadcast signal in a first broadcast band to a signal strength of the first broadcast signal in a second frequency band and determining which frequency band of the first and second frequency bands has a higher signal strength based on the comparison; and a signal processor generating a second broadcast signal by changing a phase of the first broadcast signal in the determined frequency band, and generating a third broadcast signal in the determined frequency band canceled by synthesizing the first and second broadcast signals.

The first frequency band may include upper side band (USB) of the first broadcast signal, and the second frequency band may include lower side band (LSB) of the first broadcast signal.

The controller may determine the frequency band having the higher signal strength by comparing a sum of strengths of the first broadcast signal in the first frequency band to a sum of strengths of the first broadcast signal in the second frequency band.

The signal processor may generate the second broadcast signal by delaying the phase of the first broadcast signal in the determined frequency band by 180°.

The signal processor may generate the second broadcast signal by delaying the phase of the first broadcast signal in the first frequency band by 180° when the determined frequency band corresponds to the first frequency band.

The signal processor may generate the second broadcast signal by delaying the phase of the first broadcast signal in the second frequency band by 180° when the determined frequency band corresponds to the second frequency band.

The signal processor may generate the third broadcast signal in the first frequency band canceled by synthesizing the first and second broadcast signals when the determined frequency band corresponds to the first frequency band.

The signal processor may generate the third broadcast signal in the second frequency band canceled by synthesizing the first and second broadcast signals when the determined frequency band corresponds to the second frequency band.

The received first broadcast signal may be an Amplitude Modulated (AM) signal based on an AM frequency.

Furthermore, in accordance with embodiments of the present disclosure, a method for controlling an audio system includes: receiving a first broadcast signal corresponding to a frequency selected by a user; comparing a signal strength of the first broadcast signal in a first broadcast band to a signal strength of the first broadcast signal in a second frequency band; determining which frequency band of the first and second frequency bands has a higher signal strength based on the comparison; generating a second broadcast signal by changing a phase of the first broadcast signal in the determined frequency band; and generating a third broadcast signal in the determined frequency band canceled by synthesizing the first and second broadcast signals.

The determining of the frequency band having the higher signal strength may include determining the frequency band having the higher signal strength by comparing a sum of strengths of the first broadcast signal in the first frequency band to a sum of strengths of the first broadcast signal in the second frequency band. The generating of the second broadcast signal may include generating the second broadcast signal by delaying the phase of the first broadcast signal in the determined frequency band by 180°.

The generating of the second broadcast signal may include generating the second broadcast signal by delaying the phase of the first broadcast signal in the first frequency band by 180° when the determined frequency band corresponds to the first frequency band.

The generating of the second broadcast signal may include generating the second broadcast signal by delaying the phase of the first broadcast signal in the second frequency band by 180° when the determined frequency band corresponds to the second frequency band.

The generating of the third broadcast signal may include generating the third broadcast signal in the first frequency band canceled by synthesizing the first and second broadcast signals when the determined frequency band corresponds to the first frequency band.

The generating of the third broadcast signal may include generating the third broadcast signal in the second frequency band canceled by synthesizing the first and second broadcast signals when the determined frequency band corresponds to the second frequency band.

Furthermore, in accordance with embodiments of the present disclosure, a vehicle includes an audio system including: a receiver receiving a first broadcast signal corresponding to a frequency selected by a user; a controller comparing a signal strength of the first broadcast signal in a first broadcast band to a signal strength of the first broadcast signal in a second frequency band and determining which frequency band of the first and second frequency bands has a higher signal strength based on the comparison; and a signal processor generating a second broadcast signal by changing a phase of the first broadcast signal in the determined frequency band, and generating a third broadcast signal in the determined frequency band canceled by synthesizing the first and second broadcast signals.

The controller may determine the frequency band having the higher signal strength by comparing a sum of strengths of the first broadcast signal in the first frequency band to a sum of strengths of the first broadcast signal in the second frequency band.

The signal processor may generate the second broadcast signal by delaying the phase of the first broadcast signal in the determined frequency band by 180°.

The signal processor may generate the second broadcast signal by delaying the phase of the first broadcast signal in the first frequency band by 180° when the determined frequency band corresponds to the first frequency band.

The signal processor may generate the second broadcast signal by delaying the phase of the first broadcast signal in the second frequency band by 180° when the determined frequency band corresponds to the second frequency band.

The signal processor may generate the third broadcast signal in the first frequency band canceled by synthesizing the first and second broadcast signals when the determined frequency band corresponds to the first frequency band.

The signal processor may generate the third broadcast signal in the second frequency band canceled by synthesizing the first and second broadcast signals when the determined frequency band corresponds to the second frequency band.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which:

FIG. 4 shows the concept of a broadcast signal without noise;

FIGS. 5A and 5B show the concept of noisy broadcast signals;

FIG. 6 is a block diagram representing control flows of an audio system, according to embodiments of the present disclosure;

FIGS. 7 and 8 show the concept of determining a frequency band having higher signal strength amongst broadcast signals, according to embodiments of the present disclosure;

Figure 1:
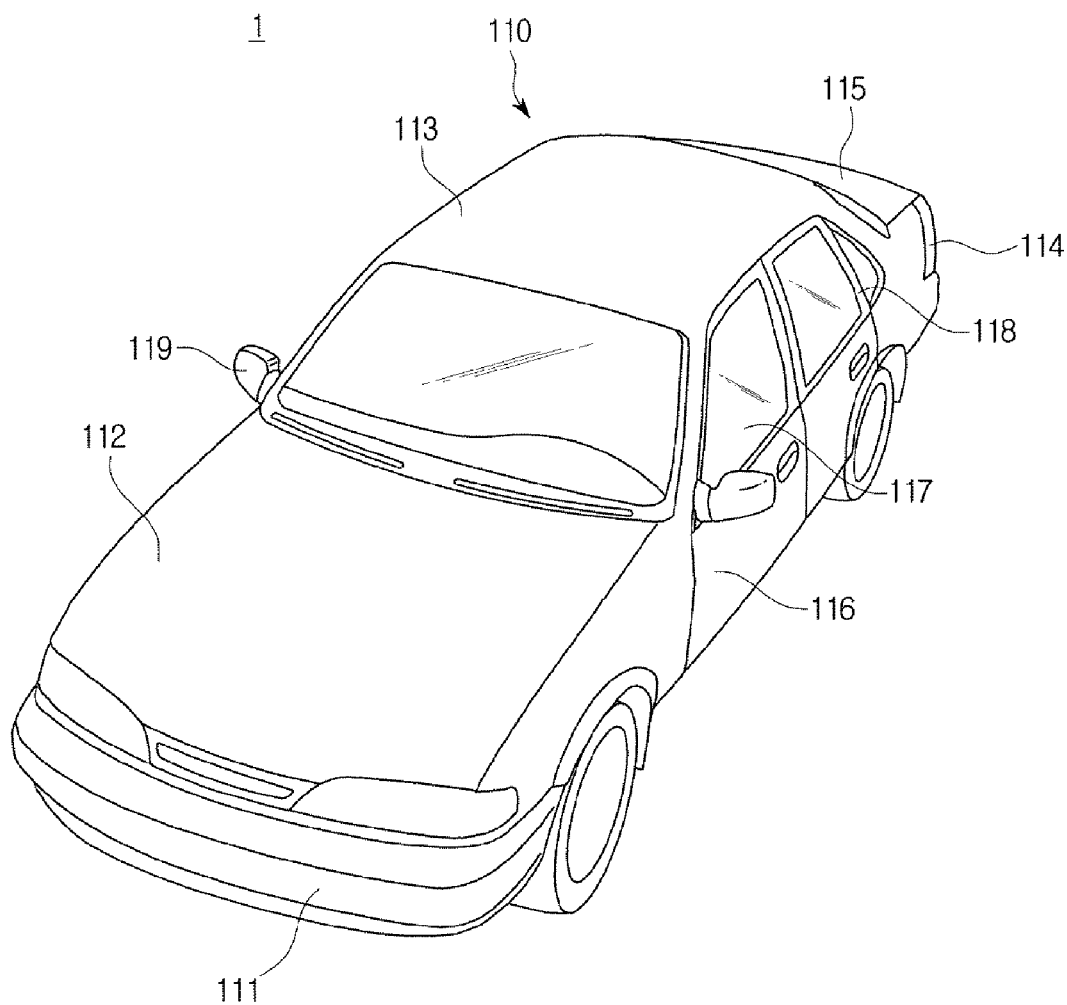
FIG. 1 shows an exterior of a vehicle, according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF EMBODIMENTS

Advantages, features, and apparatuses and methods for achieving them will be understood more clearly when the following embodiments are read with reference to the accompanying drawings. The embodiments of the disclosure may, however, be embodied in many different forms and should not be construed as limited to the embodiments set forth herein; rather, these embodiments are provided so that this disclosure will be thorough and complete, and will fully convey the scope of the embodiments of the disclosure to those skilled in the art.

The terminology used herein is for the purpose of describing particular embodiments only and is not intended to be limiting of the disclosure. Certain as used herein will be described below before the detailed description of embodiments of the present disclosure.

The terms herein are selected as common terms widely used at the present time, taking into account principles of the present disclosure, which may, however, depend on intentions of ordinary people in the art, judicial precedents, emergence of new technologies, and the like. Some terms as herein used are selected at the inventor's discretion, in which case, description thereof will be explained later in detail. Therefore, the terms should be defined based on their meanings and descriptions throughout the specification of the present disclosure.

The term "include (or including)" or "comprise (or comprising)" is inclusive or open-ended and does not exclude additional, unrecited elements or method steps. Furthermore, the term "unit" or "module" refers to a software or hardware component, such as FPGA or ASIC which plays some role. However, the unit is not limited to software or hardware. The unit may be configured to be stored in an addressable storage medium, or to execute one or more processors. For example, the unit may include components, such as software components, object-oriented software components, class components and task components, processes, functions, attributes, procedures, subroutines, segments of program codes, drivers, firmware, microcodes, circuits, data, databases, data structures, tables, arrays, and variables. Functions served by components and units may be combined into a less number of components and units, or further divided into a more number of components and units.

As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

An audio system, vehicle having the same, and method for controlling the audio system in accordance with embodiments of the present disclosure will now be described in detail with reference to accompanying drawings to be readily practiced by an ordinary skill in the art. It should be noted that what is not related to the present disclosure is omitted from the drawings. Like reference numerals refer to like components throughout the drawings, and thus the related descriptions that overlap will be omitted.

Figure 2:
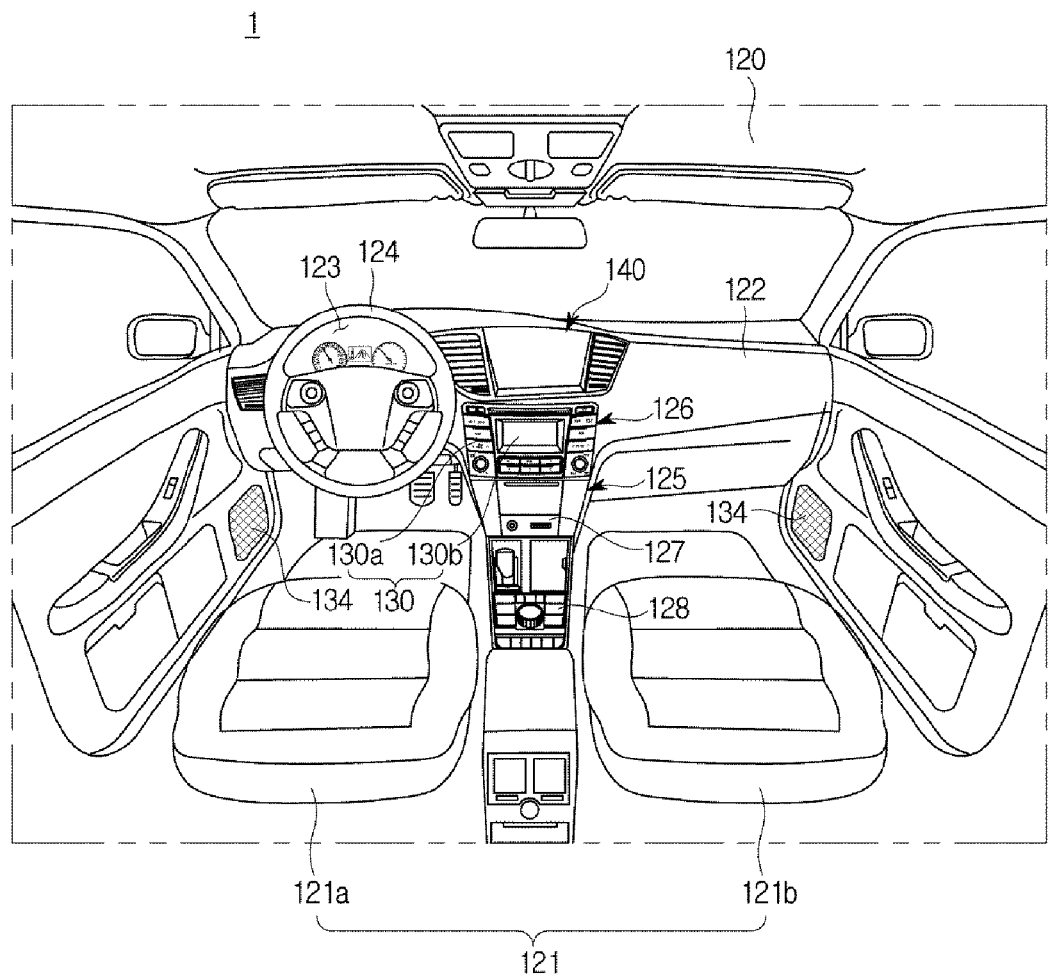
FIG. 2 shows an interior of a vehicle, according to embodiments of the present disclosure.

Referring now to the presently disclosed embodiments, FIG. 1 shows an exterior of a vehicle, according to embodiments of the present disclosure, and FIG. 2 shows an interior of a vehicle, according to embodiments of the present disclosure.

As is widely known, the vehicle 1 can move on the road by driving its wheels for the purpose of transportation of humans or goods. The vehicle 1 includes a body with exterior and interior parts, and remaining parts, i.e., chassis on which mechanical devices required for driving are installed, as described below.

As shown in FIG. 1, the exterior part 110 of the body includes a front bumper 111, a hood 112, a roof panel 113, a rear bumper 114, a trunk 115, front, back, left and right doors 116, and window glasses 117 equipped in the front, back, left and right doors 116 to be opened/closed.

The exterior part 110 further includes fillers 118 arranged on the boarders between the window glasses mounted on the front, back, left and right doors 116, the front bumper 111, the hood 112, the roof panel 113, the rear bumper 114, and the trunk 115.

Further, the window glasses 117 include side window glasses equipped in the front, back, left and right doors 116, quarter window glasses located between the fillers 118 not to be opened, a rear window glass installed on the back, and a front window glass installed on the front. The exterior part 110 of the body further includes side mirrors 119 that help the driver view areas behind the vehicle 1.

It should be understood that the exterior configuration of the vehicle 1 as described above and illustrated in FIG. 1 is provided merely for the purposes of demonstration and should not be treated as limiting the scope of the present disclosure thereto.

As shown in FIG. 2, the interior part 120 of the body includes seats 121, a dashboard 122, an instrument cluster (or cluster) 123 placed on the dashboard, containing gauges and indicators, such as a tachometer, speedometer, water temperature gauge, fuel gauge, turn signal indicator, head light indicator, warning light, seat belt warning light, odometer, gearshift position indicator, door open warning light, low fuel warning light, low oil pressure warning light, etc., a steering wheel 124 for steering control of the vehicle, and a center fascia 125 having air vents of an air conditioner (AC), a control pad, and an audio system arranged thereon.

The seats 121 include a driver seat 121a, a passenger seat 121b, and back seats located in the back of the interior of the vehicle 1.

The cluster 123 may be digitally implemented. The digitally implemented cluster 123 displays vehicle information and driving information in images.

The center fascia 125 is a part of the dashboard 122, which is located between the driver seat 121a and the passenger seat 121b.

A head unit 126 for controlling the AC and heater system may be mounted on the center fascia 125. The head unit 126 may have various buttons arranged thereon to control the AC and heater system. Inside the head unit 126, a controller to control the AC and heater system may be arranged.

The head unit 126 may also include an audio system 130 that performs a radio function, an input unit 130a for receiving operation instructions, and a display 130b for displaying information about operation. The audio system 130 equipped in the vehicle 1 may be the head unit 126 having the radio function, or may be an Audio Video and Navigation (AVN) device which is a vehicle terminal having the radio function. The audio system 130 may receive and output a broadcast signal. In FIG. 2, the audio system 130 is built into the center fascia 125, in which case a speaker 134 for outputting the broadcast signal from the audio system 130 may be installed on the front doors of the vehicle 1. Location of the speaker 134 illustrated in FIG. 2 is only by way of example, and it should be noted that the speaker 134 may be installed everywhere in the vehicle.

The display 130b may display information about operation of the AC and heater system as well.

Air vents, a cigar jack, etc., may also be installed in the center fascia 125. There may also be a multi-terminal 127 arranged in the center fascia 125, through which a user equipment (UE, not shown) may be wiredly connected. That is, the multi-terminal 127 may enable wired communication between the head unit 126 or the vehicle terminal 140 and the UE.

The multi-terminal 127 may include a Universal Serial Bus (USB) port, an Auxiliary (AUX) terminal, and further an SD slot. The multi-terminal 127 may be arranged to be close to the vehicle terminal 140 and electrically connected to the vehicle terminal 140 and an external device via a connector or cable. The external device may include a storage device, a UE, an MP3 player, etc., and the storage device may include a card-type memory and an external hard disk. The UE may be a mobile communication device including a smart phone, a laptop, a tablet, etc. The vehicle 1 may further include a manipulation unit 128 for receiving instructions to operate various functions.

The manipulation unit 128 may be arranged on the head unit 126 and center fascia 125, including at least one mechanical button, such as ON/OFF buttons for operation of various functions, buttons to change settings of various functions, etc. The manipulation unit 128 may send a manipulation signal of a button to a controller in the head unit 126 or the vehicle terminal 140. For example, the manipulation unit 128 may receive an operation ON/OFF instruction and a selection of a function from among a plurality of functions, and even send the selected function to the vehicle terminal 140. Specifically, the manipulation unit 128 may receive information about a destination while the navigation function is selected, and send information about the information about the destination to the vehicle terminal 140; receive information about a broadcasting channel and volume while the DMB function is selected, and send the information about a broadcasting channel and volume to the vehicle terminal 140; receive information about a radio channel and radio volume while the radio function is selected, and send the information about a radio channel and radio volume to the vehicle terminal 140 or the display 130*b*.

The manipulation unit 128 may include a touch panel incorporated into the display of the vehicle terminal 140. The manipulation unit 128 may be displayed on the display of the vehicle terminal 140 in the form of at least one button, and receive information of the location of the button. The manipulation unit 128 may also include a jog dial (not shown) or touch pad for the user to input an instruction to move or select a cursor displayed on the display of the vehicle terminal 140. The manipulation unit 128 may send a signal resulting from manipulation of the jog dial or a signal resulting from touching the touch pad to the vehicle terminal 140.

The jog dial or touch pad may be arranged on the center fascia. The manipulation unit 128 may receive an instruction for automatic channel change while the radio function is being performed.

The display 130*b* may display information about operation of the head unit 126 and display information input to the manipulation unit 128. For example, the display 130*b* may display information about a radio channel and radio volume input by the user while the radio function is performed. The display 130*b* may display information about the input instruction for automatic channel change and information about the automatic channel change being performed.

The vehicle terminal 140 may be detachably installed on the dashboard as well. The vehicle terminal 140 may perform audio, video, navigation, DMB, radio, GPS reception functions.

The chassis of the vehicle 1 includes a power generating system, a power transfer system, a traveling gear, a steering system, a braking system, a suspension system, a transmission system, a fuel system, front, rear, left, and right wheels, etc. The vehicle 1 may further include various safety systems for safety of the driver and passengers.

The safety systems may include an airbag control unit for the purpose of the safety of driver and passengers in case of car crashes, and an Electronic Stability Control (ESC) unit for stabilizing the vehicle's position while the vehicle 1 is accelerating or cornering.

In addition, the vehicle 1 may include detection devices, such as approximation sensors for detecting an obstacle or other vehicle to the sides or behind, a rain sensor for detecting whether it is raining and an amount of rainfall, wheel speed sensors for detecting speed of the front, back, left and right wheels, an acceleration sensor for detecting acceleration of the vehicle 1, an angular speed sensor for detecting steering angle of the vehicle 1, etc.

The vehicle 1 includes an Electronic Control Unit (ECU) for controlling operation of the power generating system, power transfer system, traveling gear, steering system, braking system, suspension system, transmission system, fuel system, various safety systems and detection devices. Furthermore, the vehicle 1 may also include electronic devices, such as a hands-free system, Bluetooth device, a rear camera, a charging system for UE, E-Z pass (hi-pass in Korea) equipment, etc.

The vehicle 1 may further include an engine start button to provide an operation instruction to a start motor (not shown). Specifically, pushing the engine start button drives the start motor, which in turn drives the power generating system, i.e., an engine (not shown).

The vehicle 1 further includes a battery (not shown) electrically connected to a terminal, audio system, indoor lighting system, start motor, and other electronic devices for supplying power. The battery is charged by means of dynamic power of the internal generator or the engine while the vehicle is being driven.

The vehicle 1 may further include a communication device for communication among the internal electronic devices and communication with an external device, such as the UE. The communication device may include a Controller Area Network (CAN) module, a Wireless Fidelity (Wi-Fi) communication module, a USB module, and a Bluetooth communication module. The communication device may further include a broadcasting communication module, such as TPEG, SXM, RDS, etc., for e.g., DMB.

It should be understood that the interior configuration of the vehicle 1 as described above and illustrated in FIG. 2 is provided merely for the purposes of demonstration and should not be treated as limiting the scope of the present disclosure thereto.

Figure 3:
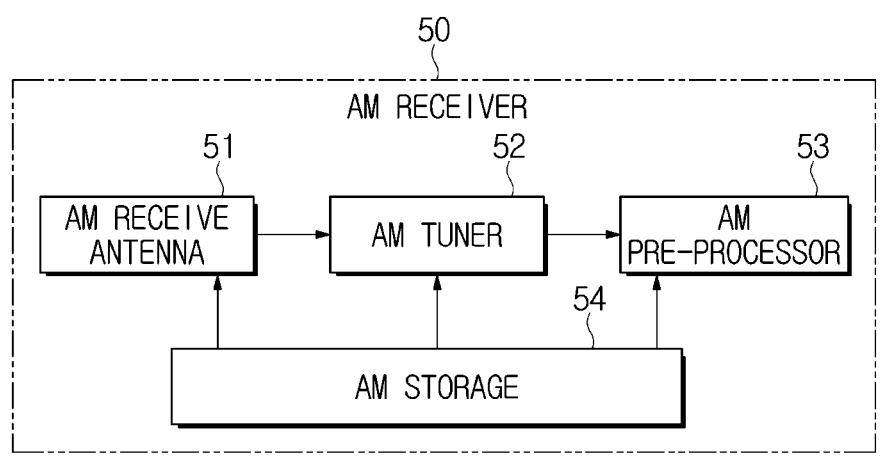
FIG. 3 is a control block diagram of an Amplitude Modulation (AM) receiver included in an audio system, according to embodiments of the present disclosure.

FIG. 3 is a control block diagram of an Amplitude Modulation (AM) receiver included in an audio system, according to embodiments of the present disclosure.

An audio system and method for controlling the same in accordance withembodiments of the present disclosure will now be described on the assumption that the audio system 130 equipped in the vehicle 1 receives and processes an AM broadcast signal.

The audio system 130 may include an AM receiver 50 for receiving an AM signal broadcast from a desired radio station. For this, the AM receiver 50 of the vehicle 1 in accordance with an embodiment of the present disclosure may include an AM receive antenna 51 for receiving AM signals, an AM tuner 52 for obtaining an AM signal of a desired frequency among the AM signals received by the AM receive antenna 51, an AM pre-processor 53 for preprocessing the AM signal, and an AM storage 54 for storing reference data in receiving and outputting an AM signal.

The AM receive antenna 51 may receive AM broadcast signals transmitted by broadcasting stations, and the AM tuner 52 may obtain an AM signal of a desired frequency among the AM signals received by the AM receive antenna 51. Once the user selects a desired broadcasting channel, the AM tuner 52 may find a frequency corresponding to the selected broadcasting channel, and pick up an AM signal corresponding to the found frequency. The frequency corresponding to the broadcasting channel is determined in advance while the broadcasting stations transmit broadcast signals, and the information may be stored in the AM storage 54. The AM pre-processor 52 may perform echo cancellation, Automatic Gain Control (AGC), Automatic Volume Control (AVC), and noise suppression (NS) on the obtained AM signal.

Figure 5B:
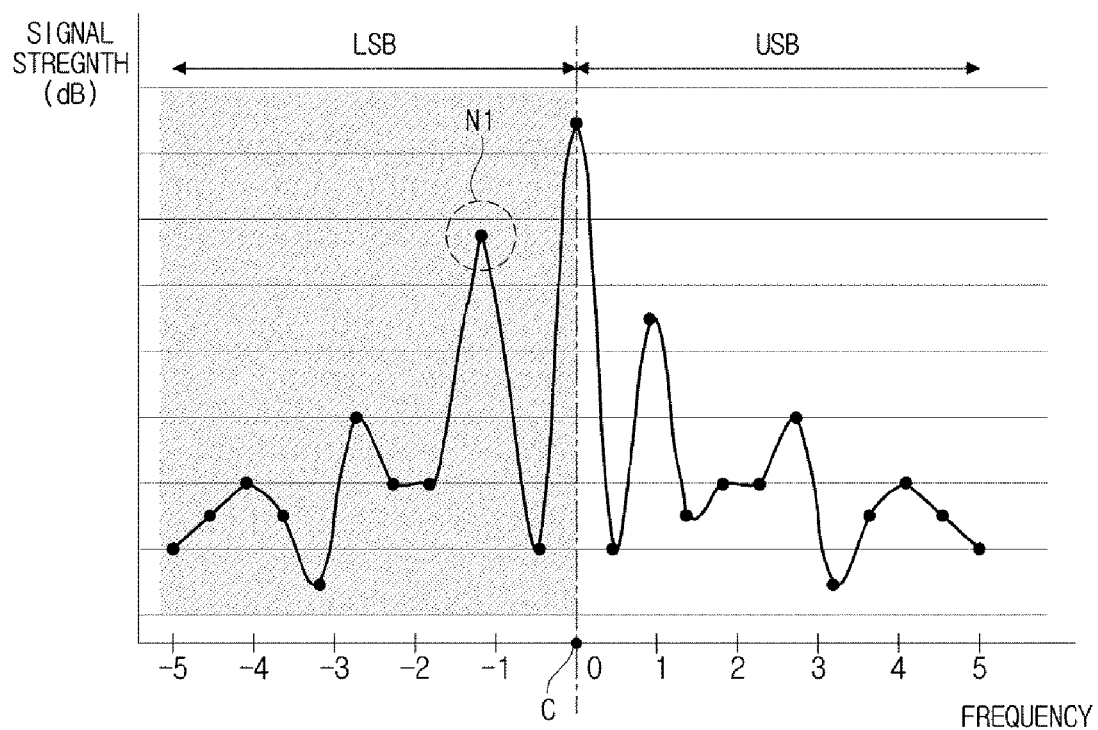

FIG. 4 shows the concept of a broadcast signal without noise, and FIGS. 5A and 5B show the concept of noisy broadcast signals.

In the illustrated concept of a broadcast signal, the unit on each coordinate axis is only by way of example to clarify the description, and is not limited to what is shown in the illustrations.

Referring first to FIG. 4, a modulated broadcast signal may be received by a receiver of the audio system equipped in the vehicle 1. In embodiments of the present disclosure, the AM broadcast signal is modulated in the broadcasting station for transmission, in which case a sound signal is not transmitted intact in radio waves but is converted for transmission by using high frequency current with a certain amplitude and frequency determined by the broadcasting station, the high frequency current being called a carrier wave having a carrier frequency. In other words, the AM broadcast signal undergoes amplitude modulation to modulate the amplitude of the signal, and the amplitude-modulated signal is carried on the carrier wave for transmission. In this case, the frequency of the signal barely changes and the amplitude changes to have a waveform similar to the sound signal. The AM broadcast signal has the merit of having a long propagation distance and long wavelength and having a simple transmission structure, but also has the downside that it has poor sound quality because the AM broadcast signal is likely to be seriously jammed up and mixed with some noise.

As shown in FIG. 4, an AM broadcast signal received by the receiver may have upper side band (USB) and lower side band (LSB) which are symmetric to each other with respect to a carrier frequency C. In other words, in a case a broadcast signal with some frequency components is modulated into signal waves, a frequency band located on the right (upper) side with respect to the carrier frequency C of the carrier wave is referred to as USB, and a frequency band located on the left (lower) side with respect to the carrier frequency C is referred to as LSB.

An AM broadcast signal may be modulated for transmission to commonly have a bandwidth of 9 kHz and the USB and LSB of the AM broadcast signal contains the same information, in which case if a sound signal is detected from either of the USB and LSB, the signal having the same information may be output. In other words, in a case an AM broadcast signal received by the receiver has no noise, the USB and LSB centered on the carrier frequency C are symmetric to each other and may have the same signal information.

However, as shown in FIGS. 5A and 5B, if an AM broadcast signal contains noise, the USB and LSB may not be symmetric to each other, and signal waveforms in the noisy frequency band and noise-free frequency band may be differently represented.

FIG. 5A shows an AM broadcast signal having noise in USB, and FIG. 5B shows an AM broadcast signal having noise in LSB. As shown in FIG. 5A, the noise contained in the USB causes a noisy signal N1 that is not symmetric to the LSB, and as shown in FIG. 5B, the noise contained in the LSB causes a noisy signal N2 that is not symmetric to the USB.

Figure 9:
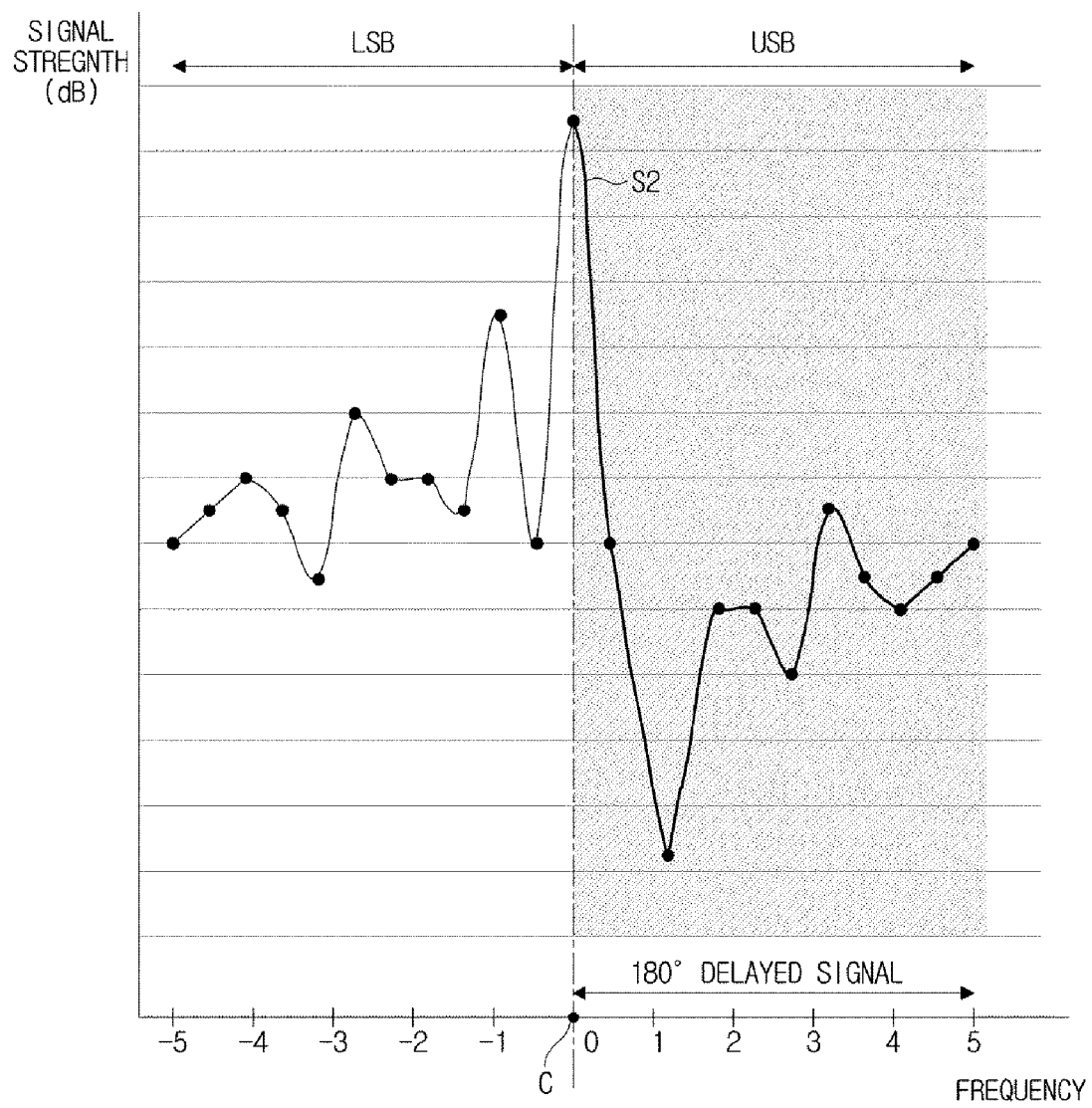
FIG. 9 shows the concept of changing the phase of a broadcast signal in upper-side band (USB) of the broadcast signal, according to embodiments of the present disclosure.
Figure 10:
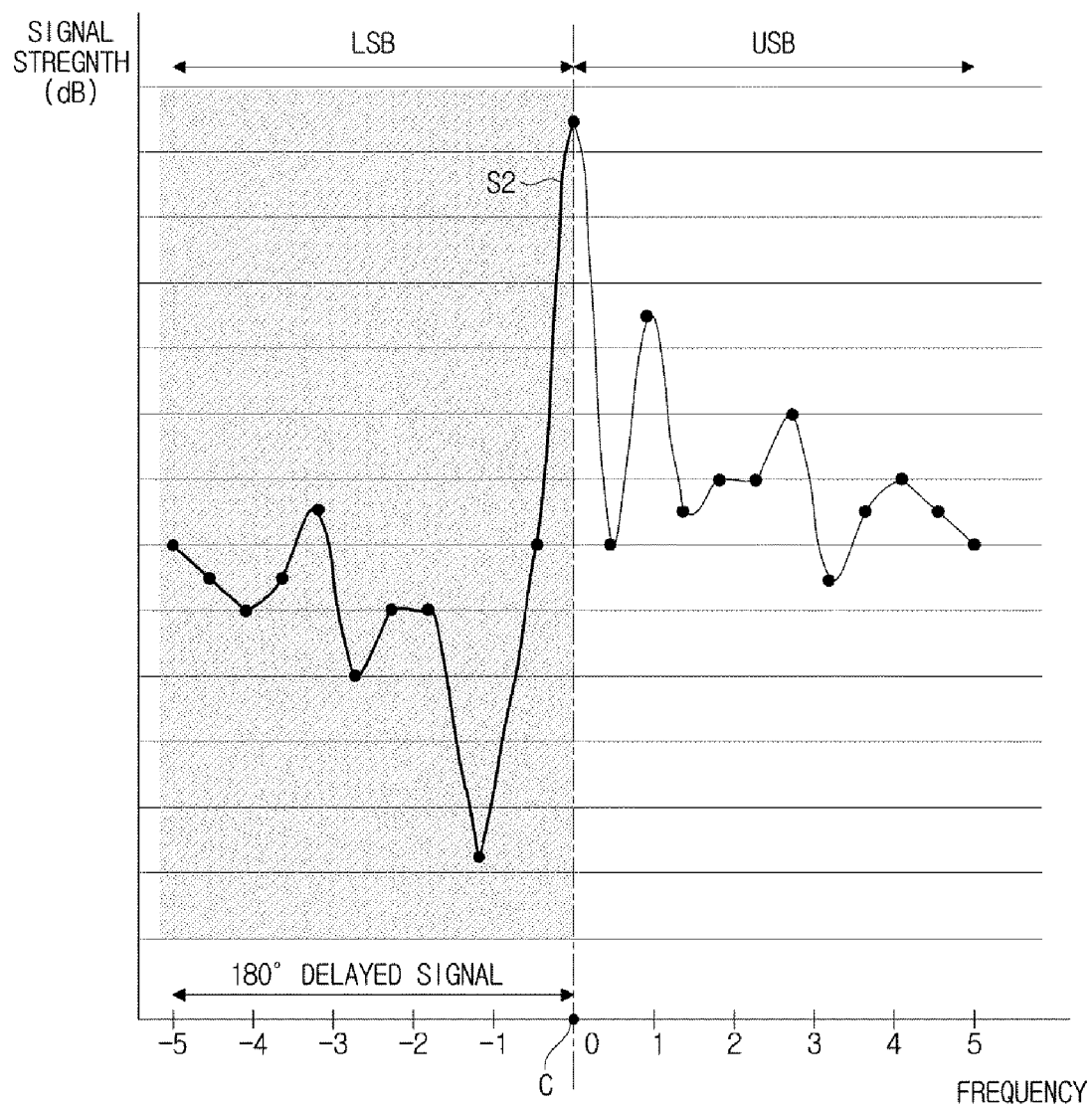
FIG. 10 shows the concept of changing the phase of a broadcast signal in lower-side band (LSB) of the broadcast signal, according to embodiments of the present disclosure.
Figure 11:
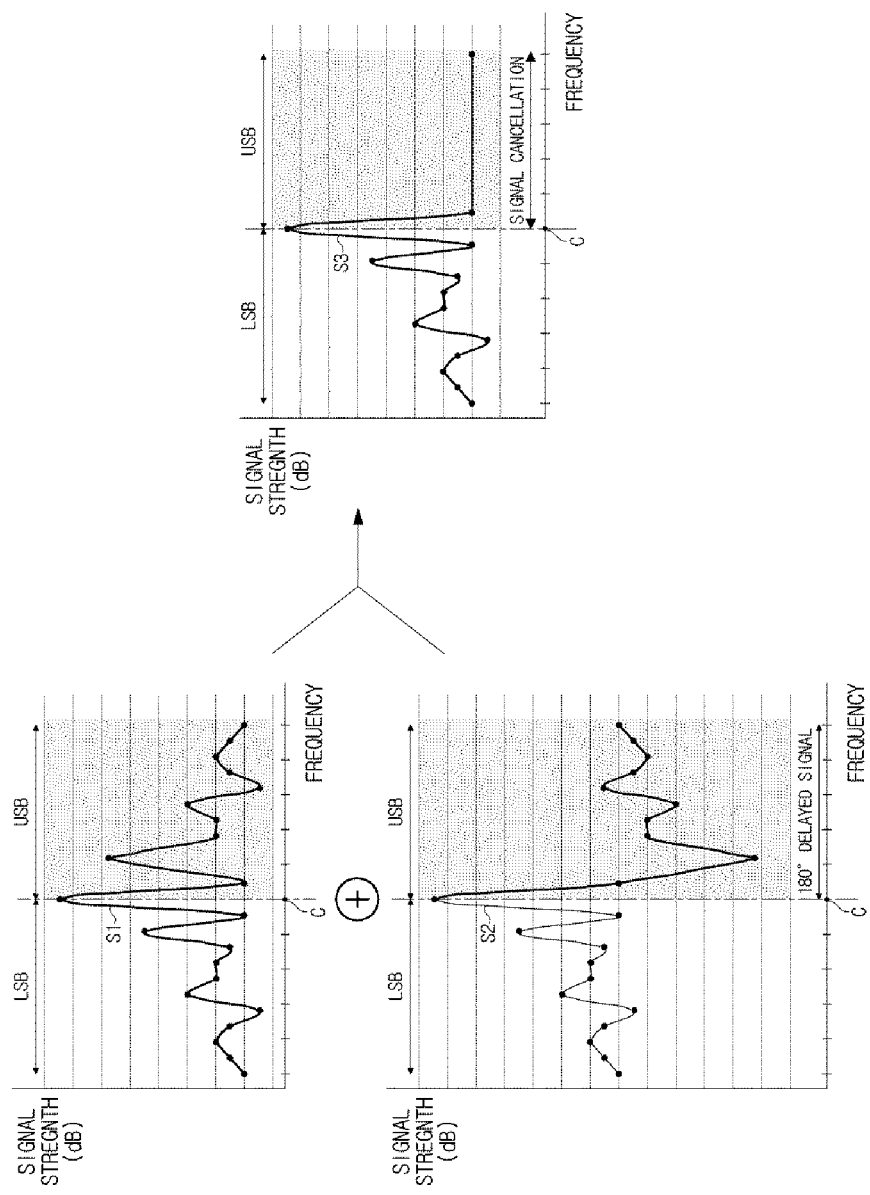
FIG. 11 shows the concept of generating a signal with a USB broadcast signal canceled, according to embodiments of the present disclosure.
Figure 12:
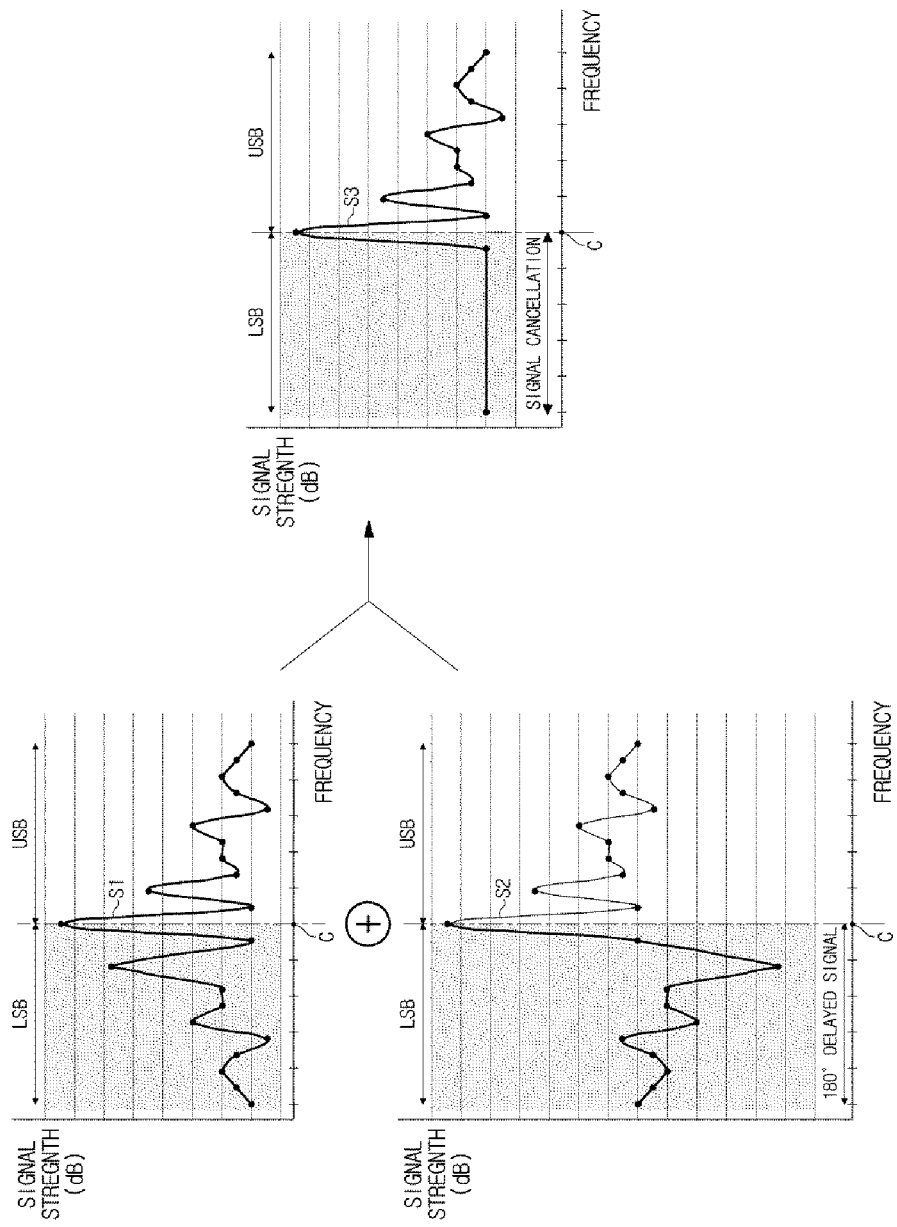
FIG. 12 shows the concept of generating signals with an LSB broadcast signal canceled, according to embodiments of the present disclosure.

FIG. 6 is a block diagram representing control flows of an audio system, according to embodiments of the present disclosure. FIGS. 7 and 8 show the concept of determining a frequency band having higher signal strength amongst broadcast signals, according to embodiments of the present disclosure. FIG. 9 shows the concept of changing the phase of a broadcast signal in USB of the broadcast signal, according to embodiments of the present disclosure, and FIG. 10 shows the concept of changing the phase of a broadcast signal in LSB of the broadcast signal, according to embodiments of the present disclosure. FIG. 11 shows the concept of generating a signal with the USB broadcast signal eliminated, according to embodiments of the present disclosure, and FIG. 12 shows the concept of generating a signal with the LSB broadcast signal eliminated, according to embodiments of the present disclosure.

Referring first to FIG. 6, the audio system 130 may include an input unit 130a, a display 130b, a receiver 132, a second amplifier 133, a speaker 134, a controller 135, a storage 136, and a signal processor 140.

The audio system 130 may include a radio function for receiving and outputting a broadcast signal transmitted from a radio station, and also include a reproduction function for reproducing music stored in a CD or other storage medium.

The input unit 130a may receive at least one operation instruction from the user, and send an operation signal corresponding to the at least one operation instruction to the controller 135. The input unit 130a may receive ON/OFF instruction for the radio function, and receive an instruction to change radio broadcasting volume or frequency while the radio function is being performed. The input unit 130a may include power ON/OFF button, volume control button, and frequency selection button, and send a signal of operation of a user-selected button to the controller 135. The frequency selection button for receiving an instruction to change frequency receives an instruction to change the current frequency to another, and may include an up button to scan higher frequencies than the current frequency in the increasing order and a down button to scan lower frequencies than the current frequency in the decreasing order.

The display 130b may display information about a currently activated mode. For example, the display 130b may display information about a currently activated mode, such as radio mode for performing the radio function, audio mode for playing music, call mode for performing a phone call, DMB mode for watching broadcasts, navigation mode for guidance, etc. The display 130b may display ON or OFF of the radio mode, a radio broadcasting frequency selected by the user in the radio mode, and a radio volume level. The display 130b may also display a frequency scan mode when the frequency selection button is chosen. Specifically, the display 130b may display a frequency scan mode indicating whether a frequency is automatically scanned based on a preference scan mode or on a normal scan mode. The display 130b may be a flat display panel, such as a Liquid Crystal Display (LCD), a Plasma Display Panel (PDP), Organic Light Emitting Diodes (OLEDs), etc., or may be a display built into the vehicle terminal.

The antenna 131 may receive broadcast signals transmitted from respective broadcasting stations owned by a plurality of broadcasting companies and forward the received broadcast signals to the receiver 132. While the radio mode is activated, the receiver 132 may receive a broadcast signal by tuning in a previously selected frequency. The receiver 132 may select a frequency in response to a frequency selection instruction of the controller 135, and receive a broadcast signal transmitted at the selected frequency. The frequency selection instruction as herein used is an instruction to select a frequency based on a preference scan mode or a normal scan mode in an increasing or decreasing order.

To explain configuration of the receiver 132, a mechanism of transmitting broadcast signals from a radio station will be briefly described. There is a transmitter at a radio station. The transmitter may convert sound waves collected by a microphone to an electric signal and transmit the electric signal through a transmit antenna in the form of radio waves, or may transmit an electric signal of music intended to be output in the form of radio waves.

The electric signal converted from the sound waves has an audible frequency ranging from 20 Hz to 20,000 Hz. The transmitter may transmit the electric signal of a sound by carrying it on a high frequency radio wave. This is because the electric signal has a frequency too low to be transmitted through the transmit antenna.

The high frequency radio wave carrying the sound signal is referred to as the carrier wave. The receiver 132 may then receive the radio wave transmitted from the broadcasting station (or radio station) through the antenna 131, and separate the radio wave into a sound signal and high frequency signals, enabling the sound signal to be output in its original waveform. The radio station may also transmit digital radio broadcasts.

The receiver 132 may include a tuner 132a for receiving an electric signal, i.e., broadcast signal corresponding to a frequency selected by the user, a first amplifier 132b for amplifying the broadcast signal received by the tuner 132a, and a detector 132c for demodulating the amplified broadcast signal and outputting the signal within an audible frequency range. More specifically, the tuner 132a may pick up and output radio waves, i.e., electric signals corresponding to the selected frequency from among a plurality of radio waves received through the antenna 131. This is because various radio waves modulated with different carrier waves and transmitted by a plurality of broadcasting stations are received by the antenna 131.

The first amplifier 132b may amplify a weak high frequency signal among the picked-up radio waves to be a strong high frequency signal. That is, the first amplifier 132b is a high frequency amplifier.

The detector 132c may separate the amplified high frequency signal into a sound signal and a carrier wave. The second amplifier 133 may be connected to the detector 132c for amplifying a signal output from the detector 132c and sending the amplified signal to the speaker 134.

As for the sound signal separated by the detector 132c, it needs to be further amplified by the second amplifier 133 because it is too weak to be listened to through the speaker 134. The second amplifier 133 is a low frequency amplifier.

The speaker 134 converts the amplified low-frequency sound signal into the original sound wave and produces waves of condensation to radiate the sound wave for the information transmitted by the broadcasting station to be audible to the user.

The receiver 132 may also receive an electric signal of music information in addition to electric signals of comments, music, advertisements, etc., and also receive digital radio broadcasts. The receiver 132 may perform a function of a radio transceiver based on digital signal processing. The receiver 132 may receive information about music while the radio station is transmitting the music, and may also receive information about an advertisement while the advertisement is transmitted.

Once an operation signal of a power ON/OFF button is received through the input unit 130a while the radio mode is off, the controller 135 may activate the radio mode, check the previously selected frequency, and control the receiver 132 to receive a broadcast signal corresponding to the frequency.

Once an operation signal of the power ON/OFF button is received through the input unit 130a while the radio mode is on, the controller 135 may inactivate the radio mode and store the selected frequency. Furthermore, the controller 135 may compare signal strength between USB and LSB included in an AM broadcast signal received by the receiver 132, and determine a frequency band having higher signal strength based on the comparison.

In the following description, the AM broadcast signal is defined as a first broadcast signal, USB of the first broadcast signal is defined as a first frequency band, and LSB of the first broadcast signal is defined as a second frequency band. Further, a broadcast signal generated by changing the phase of the first broadcast signal is defined as a second broadcast signal, and a broadcast signal generated by combining the first and second broadcast signals is defined as a third broadcast signal.

Referring next to FIG. 7, the controller 135 may receive the first broadcast signal S1, which may be divided into the first and second frequency bands USB and LSB, respectively, as described above. As described above in connection with FIG. 5, if the first broadcast signal S1 has no noise, the first and second frequency bands may be symmetric to each other with respect to the carrier frequency C, and otherwise if the first broadcast signal S1 is noisy, the first and second frequency bands may not be symmetric to each other.

The controller 135 may determine which one of the first and second frequency bands has stronger signals, and then determine that the frequency band having stronger signals contains noisy signals. As shown in FIG. 7, in a case the first and second frequency bands of the first broadcast signal are not symmetric to each other and the first frequency band contains noisy signal N1, the first frequency band may appear to have stronger signals.

Upon reception of the first broadcast signal S1, the controller 135 may compare signal strength between the first and second frequency bands with respect to the carrier frequency C, and store amplitudes of first and second frequency band signals in the storage 136 by frequency band. Specifically, the first broadcast signal S1 may be represented in a graph as shown in FIG. 7, and the respective points in the graph have their respective signal strengths, which may be stored in the storage 136 and used by the controller 136 in comparing sums of signal strengths.

As shown in FIG. 7, data about strength of signals included in the first frequency band of the first broadcast signal S1 may be stored as $A_1, A_2, A_3, \ldots, A_{n-1}, A_n$, and the controller 135 may combine all the data about strength of signals to calculate a signal strength of the first frequency band.

Likewise, as shown in FIG. 8, data about strength of signals included in the second frequency band of the first broadcast signal S1 may be stored as $B_1, B_2, B_3, \ldots, B_{n-1}, B_n$, and the controller 135 may combine all the data about strength of signals to calculate a signal strength of the second frequency band.

If the first frequency band of the first broadcast signal has noise as shown in FIG. 7, a sum of all the data about strength of signals included in the first frequency band is greater than a sum of all the data about strength of signals included in the second frequency band, in which case the controller 135 may determine that the first frequency band includes noisy signal N1 based on the calculation result.

Otherwise, If the second frequency band of the first broadcast signal has noise, as shown in FIG. 8, a sum of all the data about strength of signals included in the second frequency band is greater than a sum of all the data about strength of signals included in the first frequency band, in which case the controller 135 may determine that the second frequency band includes noisy signal N2 based on the calculation result.

A method for the controller 135 to determine which one of the first and second frequency bands has a noisy signal is implemented in various embodiments, and not limited to what is described above in connection with FIGS. 7 and 8. The controller 135 may be implemented, as an example, using an array of multiple logic gates, or using a combination of a universal microprocessor and a memory that stores a program executable in the microprocessor.

The signal processor 140 may include a signal phase converter 141 and a signal synthesizer 142. The signal processor 140 may receive data about a frequency band determined by the controller 135 to have higher signal strength, and generate a second broadcast signal S2 by changing the phase of the first broadcast signal 51 based on the received data.

Specifically, the signal phase converter 141 included in the signal processor 141 may delay the phase of the first broadcast signal S1 by 180° to generate the second broadcast signal S2, and a frequency band of the first broadcast signal S1 to be phase-delayed may be determined based on data about a frequency band determined by the controller 135 to have higher signal strength.

If the controller 135 determines that the first frequency band of the first broadcast signal S1 includes noisy signal N1 as shown in FIG. 7, the signal phase converter 141 may delay the phase of the first broadcast signal S1 included in the first frequency band by 180° to generate the second broadcast signal S2. In other words, the second broadcast signal S2 phase-changed by the signal phase converter 141 in the first frequency band has the same amplitude but is delayed by 180° as compared to the first broadcast signal S1.

Likewise, if the controller 135 determines that the second frequency band of the first broadcast signal S1 includes noisy signal N2 as shown in FIG. 8, the signal phase converter 141 may delay the phase of the first broadcast signal S1 included in the second frequency band by 180° to generate the second broadcast signal S2. That is, the second broadcast signal S2 phase-changed by the signal phase converter 141 in the second frequency band has the same amplitude but is delayed by 180° as compared to the first broadcast signal S1.

The storage 136 may store both the first broadcast signal S1 which has not been phase-changed and the second broadcast signal S2 which has been phase-changed, and the data may be provided to the signal synthesizer 142.

The signal synthesizer 142 included in the signal processor 140 may synthesize the first broadcast signal S1 not phase-changed and the second broadcast signal S2 phase-changed. Specifically, the signal synthesizer 142 may receive the second broadcast signal S2 phase-changed from the signal phase converter 141, and synthesize it with the first broadcast signal S1 to generate a third broadcast signal S3.

FIG. 11 shows synthesis of the first broadcast signal S1 and the second broadcast signal S2 generated by delaying the phase of the first broadcast signal S1 included in the first frequency band by 180°. Specifically, if the first frequency band of the first broadcast signal S1 includes noisy signal N1, the signal phase converter 142 may change the phase of the signal included in the first frequency band, and the signal synthesizer 142 may generate the third broadcast signal S3 by synthesizing the first and second broadcast signals S1 and S2.

In this case where the first and second broadcast signals S1 and S2 are synthesized while the noisy signal N1 exists in the first frequency band, the first frequency band signal of the second broadcast signal S2 has the same amplitude but is delayed by 180° compared to the first frequency band signal of the first broadcast signal S1, and thus the third broadcast signal S3 may be output with the broadcast signal in the first frequency band canceled.

FIG. 12 shows synthesis of the first broadcast signal S1 and the second broadcast signal S2 generated by delaying the phase of the first broadcast signal S1 included in the second frequency band by 180°. Specifically, if the second frequency band of the first broadcast signal S1 includes noisy signal N2, the signal phase converter 142 may change the phase of the signal included in the second frequency band, and the signal synthesizer 142 may generate the third broadcast signal S3 by synthesizing the first and second broadcast signals S1 and S2.

In this case where the first and second broadcast signals S1 and S2 are synthesized while the noisy signal N2 exists in the second frequency band, the second frequency band signal of the second broadcast signal S2 has the same amplitude but is delayed by 180° compared to the second frequency band signal of the first broadcast signal S1, the third broadcast signal S3 may be output with the broadcast signal in the second frequency band canceled.

That is, the third broadcast signal S3 having no noisy signal may be generated by synthesizing the first broadcast signal S1 and the second broadcast signal S2 generated by changing the phase of the first broadcast signal in the frequency band having the noisy signal N1 or N2. Since sound information included in an AM broadcast signal is included in a frequency band of the third broadcast signal S3 with no signal canceled, the sound information may be delivered by outputting the broadcast signal in the frequency band.

The procedure of generating the second broadcast signal by phase shift of the first broadcast signal S1 and generating the third broadcast signal S3 by synthesizing the first broadcast signal S1 and the second broadcast signal S2 may be expressed in the following equation.

First, assuming that an AM broadcast signal is denoted by $x(t)$, and the first broadcast signal S1 including a noisy signal is denoted by $n(t)$, $y(t)=x(t)+n(t)$. The signal may be represented in the frequency domain as $Y(W)=X(W)+N(W)$, which may also be expressed with a term $C(W)$ of the carrier frequency C for AM modulation as follows: $Y(W)=X_{USB}(W)+X_{LSB}(W)+C(W)+N(W)$, where $X_{USB}(W)$ is a signal in the first frequency band included in the first broadcast signal S1, and $X_{LSB}(W)$ is a signal in the second frequency band included in the first broadcast signal S1.

If noisy signal N1 is included in the first frequency band, the signal phase converter 141 may generate the second broadcast signal S2 by delaying the phase of the first broadcast signal S1 in the first frequency band by 180°, which may be expressed as $Y'(W)=X_{LSB}(W)-(X_{USB}(W))+N(W)+C(W)$. That is, the phases of the first broadcast signal XUSB(W) and the noisy signal N(W) may be delayed by 180°.

The signal synthesizer 142 may synthesize the first broadcast signal S1 (Y(W)) and the second broadcast signal S2 (Y'(W)) to generate the third broadcast signal S3 (Y"(W)), which may be expressed as $Y"(W) \doteqdot Y"(W)=Y(W)+Y'(W)$ $2X_{LSB}(W)+2C(W)$.

Accordingly, when the third broadcast signal S3 is detected, the broadcast signal with the noisy signal included in the first frequency band canceled may be output.

Likewise, if noisy signal N1 is included in the second frequency band, the signal phase converter 141 may generate the second broadcast signal S2 by delaying the phase of the first broadcast signal S1 in the second frequency band by 180°, which may be expressed as $Y'(W)=X_{USB}(W)-(X_{LSB}(W)+N(W))+C(W)$. That is, the phases of the second broadcast signal $X_{LSB}(W)$ and the noisy signal N(W) may be delayed by 180°.

The signal synthesizer 142 may synthesize the first broadcast signal S1 (Y(W)) and the second broadcast signal S2 (Y'(W)) to generate the third broadcast signal S3(Y"(W)), which may be expressed as $Y"(W)=Y(W)+Y'(W)=2X_{USB}(W)+2C(W)$.

Accordingly, when the third broadcast signal S3 is detected, the broadcast signal with the noisy signal included in the second frequency band canceled may be output.

Figure 13:
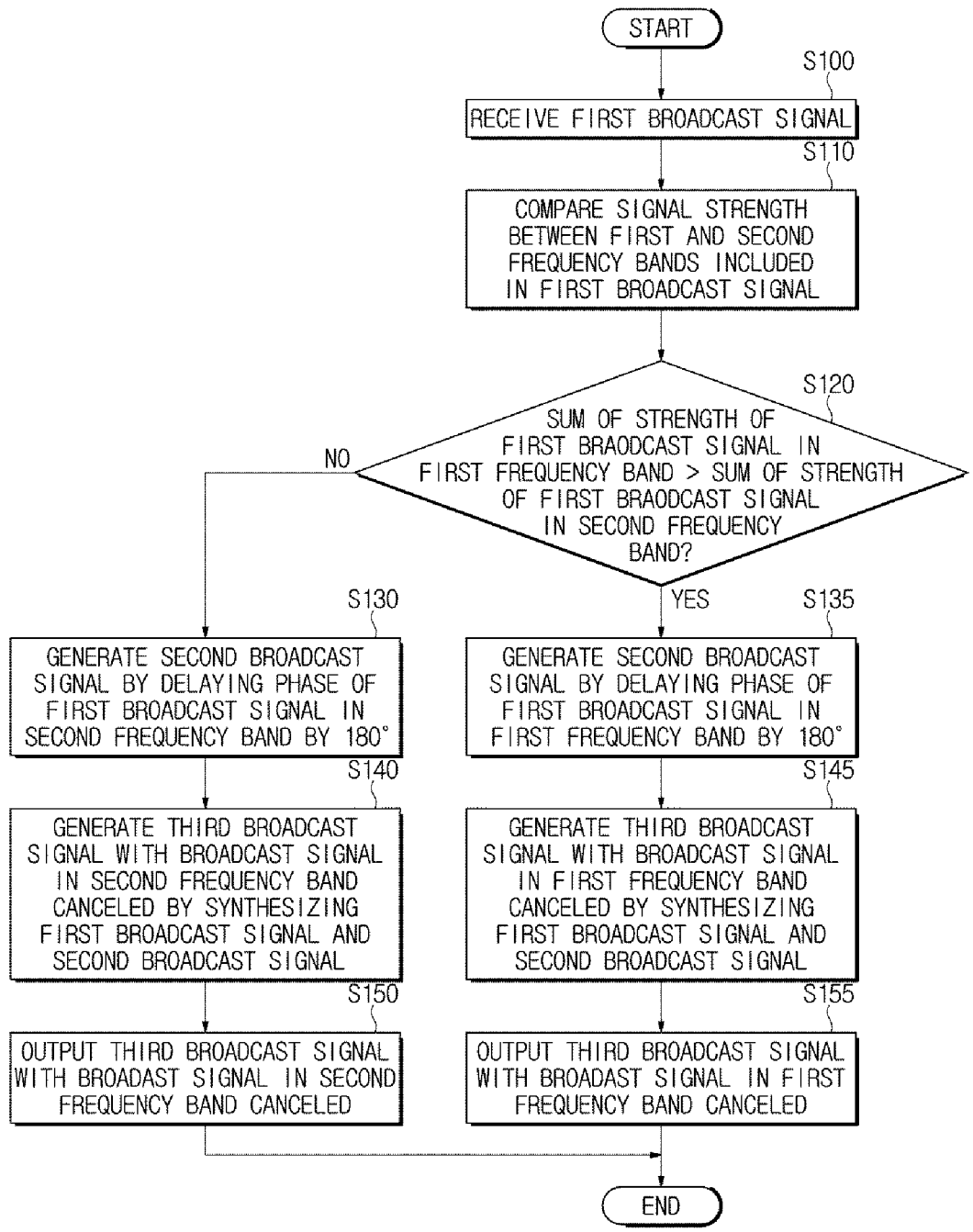
FIG. 13 is a flowchart illustrating a method for controlling an audio system, according to embodiments of the present disclosure.

FIG. 13 is a flowchart illustrating a method for controlling an audio system, according to embodiments of the present disclosure.

As shown in FIG. 13, the receiver 132 may receive the first broadcast signal S1 corresponding to an AM broadcast signal, in operation S100, and forward the received signal to the controller 135.

The controller 135 may compare signal strength of the received first broadcast signal S1 between the first and second frequency bands with respect to the carrier frequency C, in operation S110. Detailed description of how to compare the signal strength between the first and second frequency bands was described as above in connection with FIGS. 7 and 8, so the overlapping description will be omitted herein. In addition to what is described above, there may be other various ways of comparing the signal strength between the first and second frequency bands in other embodiments.

If the comparison reveals that a sum of all data about signal strength of the first broadcast signal S1 in the first frequency band is greater than a sum of all data about signal strength of the first broadcast signal S1 in the second frequency band, in operation S120, the controller 135 may determine that the first frequency band contains noisy signal N1.

Otherwise, if the comparison reveals that a sum of all data about signal strength of the first broadcast signal S1 in the second frequency band is greater than a sum of all the data about signal strength of the first broadcast signal S1 in the first frequency band, in operation S120, the controller 135 may determine that the second frequency band contains noisy signal N2.

If the controller 135 determines that the first frequency band of the first broadcast signal S1 includes noisy signal N1, the signal phase converter 141 may delay the phase of the first broadcast signal S1 included in the first frequency band by 180° to generate the second broadcast signal S2, in operation S135.

Otherwise, if the controller 135 determines that the second frequency band of the first broadcast signal S1 includes noisy signal N2, the signal phase converter 141 may delay the phase of the first broadcast signal S1 included in the second frequency band by 180° to generate the second broadcast signal S2, in operation S130.

The signal synthesizer 142 may synthesize the first broadcast signal S1 not phase-changed and the second broadcast signal S2 phase-changed to generate the third broadcast signal S3.

In the case the first frequency band of the first broadcast signal S1 has noisy signal N1, the signal synthesizer 142 may synthesize the first broadcast signal S1 and the second broadcast signal S2 to generate the third broadcast signal S3 with the broadcast signal in the first frequency band canceled, in operation S145.

In the case the second frequency band of the first broadcast signal S1 has noisy signal N2, the signal synthesizer 142 may synthesize the first broadcast signal S1 and the second broadcast signal S2 to generate the third broadcast signal S3 with the broadcast signal in the second frequency band canceled, in operation S140.

In the case where the first and second broadcast signals S1 and S2 are synthesized while the noisy signal N1 exist in the first frequency band, the first frequency band signal of the second broadcast signal S2 has the same amplitude but is delayed by 180° compared to the first frequency band signal of the first broadcast signal S1, and thus the third broadcast signal S3 may be output with the broadcast signal in the first frequency band canceled, in operation S155.

Furthermore, in the case where the first and second broadcast signals S1 and S2 are synthesized while the noisy signal N2 exist in the second frequency band, the second frequency band signal of the second broadcast signal S2 has the same amplitude but is delayed by 180° compared to the second frequency band signal of the first broadcast signal S1, the third broadcast signal S3 may be output with the broadcast signal in the second frequency band canceled, in operation S150.

According to the present disclosure, performance of receiving audio broadcast signals is improved by canceling noisy band signals from radio broadcast signals to output noise-free broadcast signals. In other words, performance of an audio system may be improved by canceling noise through a separation and comparison process for broadcast signals, thereby eliminating the need for an extra device, such as a filter for noise cancellation. Furthermore, narrow band noise having a specific frequency included in the broadcast signal may be effectively canceled.

The embodiments of an audio system, vehicle having the same, and method for controlling the audio system are only by way of example, and the present disclosure is not limited only to the embodiments described above. Accordingly, the scope of the present disclosure should be construed as including all the modifications or other various embodiments based on the technical idea of the present disclosure. The scope of the present disclosure should be defined only by the following claims, and all the equivalents of the embodiments may also be construed to be in the scope of the present disclosure.

DESCRIPTION OF THE SYMBOLS

50: AM RECEIVER
130: AUDIO SYSTEM

132: RECEIVER
134: SPEAKER
135: CONTROLLER
136: STORAGE
140: SIGNAL PROCESSOR
141: SIGNAL PHASE CONVERTER
142: SIGNAL SYNTHESIZER

What is claimed is:

1. An audio system comprising:
    a receiver receiving a first broadcast signal corresponding to a frequency selected by a user;
    a controller programmed to:
        compare a signal strength of the first broadcast signal in a first broadcast band to a signal strength of the first broadcast signal in a second frequency band and determine which frequency band of the first and second frequency bands has a higher signal strength based on the comparison; and
        generate a second broadcast signal by changing a phase of the first broadcast signal in the determined frequency band, and generate a third broadcast signal in the determined frequency band canceled by synthesizing the first and second broadcast signals,
    wherein the controller is programmed to determine the frequency band having the higher signal strength by comparing a sum of strengths of the first broadcast signal in the first frequency band to a sum of strengths of the first broadcast signal in the second frequency band.

2. The audio system of claim 1, wherein:
    the first frequency band includes an upper side band (USB) of the first broadcast signal, and
    the second frequency band includes a lower side band (LSB) of the first broadcast signal.

3. The audio system of claim 1, wherein the controller is programmed to generate the second broadcast signal by delaying the phase of the first broadcast signal in the determined frequency band by 180°.

4. The audio system of claim 1, wherein the controller is programmed to generate the second broadcast signal by delaying the phase of the first broadcast signal in the first frequency band by 180° when the determined frequency band corresponds to the first frequency band, and generate the second broadcast signal by delaying the phase of the first broadcast signal in the second frequency band by 180° when the determined frequency band corresponds to the second frequency band.

5. The audio system of claim 1, wherein the controller is programmed to generate the third broadcast signal in the first frequency band canceled by synthesizing the first and second broadcast signals when the determined frequency band corresponds to the first frequency band.

6. The audio system of claim 1, wherein the controller is programmed to generate the third broadcast signal in the second frequency band canceled by synthesizing the first and second broadcast signals when the determined frequency band corresponds to the second frequency band.

7. The audio system of claim 1, wherein the received first broadcast signal is an Amplitude Modulated (AM) signal based on an AM frequency.

8. A method for controlling an audio system, the method comprising:
    receiving a first broadcast signal corresponding to a frequency selected by a user;
    comparing a signal strength of the first broadcast signal in a first broadcast band to a signal strength of the first broadcast signal in a second frequency band;
    determining which frequency band of the first and second frequency bands has a higher signal strength based on the comparison;
    generating a second broadcast signal by changing a phase of the first broadcast signal in the determined frequency band; and
    generating a third broadcast signal in the determined frequency band canceled by synthesizing the first and second broadcast signals,
    wherein the determining of the frequency band having the higher signal strength comprises:
        determining the frequency band having the higher signal strength by comparing a sum of strengths of the first braodcast signal in the first frequency band to a sum of strengths of the first broadcast signal in the second frequency band.

9. The method of claim 8, wherein the generating of the second broadcast signal comprises:
    generating the second broadcast signal by delaying the phase of the first broadcast signal in the determined frequency band by 180°.

10. method of claim 8, wherein the generating of the second broadcast signal comprises:
    generating the second broadcast signal by delaying the phase of the first broadcast signal in the first frequency band by 180° when the determined frequency band corresponds to the first frequency band, and
    generating the second broadcast signal by delaying the phase of the first broadcast signal in the second frequency band by 180° when the determined frequency band corresponds to the second frequency band.

11. The method of claim 8, wherein the generating of the third broadcast signal comprises:
    generating the third broadcast signal in the first frequency band canceled by synthesizing the first and second broadcast signals when the determined frequency band corresponds to the first frequency band.

12. The method of claim 8, wherein the generating of the third broadcast signal comprises:
    generating the third broadcast signal in the second frequency band canceled by synthesizing the first and second broadcast signals when the determined frequency band corresponds to the second frequency band.

13. A vehicle comprising an audio system, wherein the audio system includes:
    a receiver receiving a first broadcast signal corresponding to a frequency selected by a user;
    a controller programmed to:
        compare a signal strength of the first broadcast signal in a first broadcast band to a signal strength of the first broadcast signal in a second frequency band and determine which frequency band of the first and second frequency bands has a higher signal strength based on the comparison; and
        generate a second broadcast signal by changing a phase of the first broadcast signal in the determined frequency band, and generate a third broadcast signal in the determined frequency band canceled by synthesizing the first and second broadcast signals,
    wherein the controller is programmed to determine the frequency band having the higher signal strength by comparing a sum of strengths of the first broadcast signal in the first frequency band to a sum of strengths of the first broadcast signal in the second frequency band.

14. The vehicle of claim 13, wherein the controller is programmed to generate the second broadcast signal by delaying the phase of the first broadcast signal in the determined frequency band by 180°.

15. The vehicle of claim 13, wherein the controller is programmed to generate the second broadcast signal by delaying the phase of the first broadcast signal in the first frequency band by 180° when the determined frequency band corresponds to the first frequency band, and generate the second broadcast signal by delaying the phase of the first broadcast signal in the second frequency band by 180° when the determined frequency band corresponds to the second frequency band.

16. The vehicle of claim 13, wherein the controller is programmed to generate the third broadcast signal in the first frequency band canceled by synthesizing the first and second broadcast signals when the determined frequency band corresponds to the first frequency band.

17. The vehicle of claim 13, wherein the controller is programmed to generate the third broadcast signal in the second frequency band canceled by synthesizing the first and second broadcast signals when the determined frequency band corresponds to the second frequency band.

* * * * *

UNITED STATES PATENT AND TRADEMARK OFFICE
CERTIFICATE OF CORRECTION

PATENT NO.        : 9,928,822 B2
APPLICATION NO.   : 15/334404
DATED             : March 27, 2018
INVENTOR(S)       : Gil Sup An et al.

Page 1 of 1

It is certified that error appears in the above-identified patent and that said Letters Patent is hereby corrected as shown below:

On the Title Page

Insert Item (30):
--Foreign Application Priority Data
December 23, 2015 (KR)...........................10-2015-0184761--

Signed and Sealed this
Fifteenth Day of May, 2018

Andrei Iancu
*Director of the United States Patent and Trademark Office*